US005216540A

United States Patent [19]

Boelens

[11] Patent Number: 5,216,540

[45] Date of Patent: Jun. 1, 1993

[54] MANUFACTURING SYSTEM FOR A POLARIZING PICTURE

[76] Inventor: Christianus W. M. Boelens, Putterlaan 165, 3722 WS Bilthoven, Netherlands

[21] Appl. No.: 832,257

[22] Filed: Feb. 7, 1992

Related U.S. Application Data

[63] Continuation-in-part of Ser. No. 810,240, Dec. 19, 1991.

[30] Foreign Application Priority Data

Dec. 19, 1990 [NL] Netherlands ........................ 90.02809

[51] Int. Cl.[5] ........................ G02B 5/30; G02B 27/28; G03C 1/76

[52] U.S. Cl. ........................................ 359/486; 352/87; 352/232; 359/489

[58] Field of Search ............... 359/464, 465, 485, 490, 359/491, 501, 486, 489; 352/87, 232

[56] References Cited

U.S. PATENT DOCUMENTS

| | | | |
|---|---|---|---|
| 2,846,799 | 8/1958 | Viszlocky et al. | 359/501 |
| 2,887,007 | 5/1959 | Ryan | 359/465 |
| 3,054,204 | 9/1962 | Yates | 359/501 |
| 3,104,273 | 9/1963 | Ballance | 359/501 |
| 3,315,391 | 4/1967 | Lane et al. | 359/501 |
| 3,437,401 | 4/1969 | Siksai | 359/489 |
| 3,650,625 | 3/1972 | Hoyte, Jr. | |
| 3,807,072 | 4/1974 | Luxon, Jr. | 359/501 |
| 4,978,202 | 12/1990 | Yang | 359/465 |
| 5,050,961 | 9/1991 | Venolia | 359/465 |

FOREIGN PATENT DOCUMENTS 61-231531 2/1987 Japan .

OTHER PUBLICATIONS

Meier, M., et al., Laser-Praxis, Oct. 1990, "Laser beschriften fast alles," 8363:125-128 (with translation).

*Primary Examiner*—Martin Lerner
*Attorney, Agent, or Firm*—Pennie & Edmonds

[57] ABSTRACT

A method of manufacturing a die for a picture carrier intended for creating the impression of a movement when the picture is projected or illuminated on at least certain parts of the picture or projection, by making use of a polarizer and/or an analyzer and a picture carrier treated accordingly, whereby use is made of a laser for locally working the die.

4 Claims, 1 Drawing Sheet

MANUFACTURING SYSTEM FOR A POLARIZING PICTURE

RELATED APPLICATION

This is a Continuation-in-Part of U.S. application Ser. No. 07/810,240, filed Dec. 19, 1991.

FIELD OF THE INVENTION

The invention relates to a method of manufacturing a die for a picture carrier intended for creating the impression of a movement when the picture is projected or illuminated on at least certain parts of the picture or projection, by making use of a polarizer or an analyzer and a picture carrier treated accordingly.

BACKGROUND OF THE INVENTION

U.S. Pat. No. 3,437,401 describes a light box for animating selected parts of a picture, whereby use is made of a rotating polarizing disc and a light-interrupting foil, which is provided with several picture line patterns impressed on those parts of the foil that constitute the part to be animated. Said picture lines have been impressed on the light-interrupting foil by means of a die or a punch. For the projection use is made in principle of one or more light sources, a polarizing disc rotating in front of said light sources and a picture carrier located in front of said polarizing disc, whereby the picture carrier is locally provided with parts acting as an analyzer. Said parts acting as an analyzer may be made by providing certain tension lines according to a certain pattern, yet oriented in varying directions in the various locations. A suitable selection of the material of the picture carrier or the foil will make it possible, by impressing tension lines, to obtain a polarizing effect, on the basis of the properties of the foil material itself. Furthermore it is possible to provide unevenness, oriented in certain directions, on a foil of a suitable material and to provide an ink layer containing polarizing crystals on said foil. The orientation of said polarizing crystals will then adapt itself to the orientation of the unevenness. With such a pretreated foil it is also possible to provide a possibly colorless layer containing polarizing crystals before or after providing the colored printing inks.

This known method is, in particular, suitable for producing a large number of identical light-interrupting foils. A large number of intermediate steps are necessary, however, in order to provide the parts oriented in various directions of the picture in which a certain polarizing effect is to be effected. Thus, it is not unusual to orientate the tension lines and the like in at least nine different directions; it is more common, however, to orientate said tension lines at twenty-four different angles. For each individual direction a separate mask, such as e.g., known from lithography, is to be used.

The drawback of such a method is that it is costly, time-consuming and quite laborious, because of the great accuracy that is required, while a very high percentage of rejects will still have to be reckoned with.

The use of a die for providing local deformations at various orientations is, inter alia, described in U.S. Pat. No. 3,650,625. From this U.S. patent, it is clear how complicated and expensive (approximately $7,000) the manufacture of a die described therein is. A further drawback of this known manufacturing system is that the accuracy thereof is not satisfactory in practice, while further additional devices are die-rollers and pressing-rollers have to be used.

Laser Praxis, Oct. 1990, Munchen Carl Hansen Verlag, pp. 125 through 128 (M. Meyer et al.) describes a system to put numbers, letters and barcodes on organic and anorganic materials while using a laser. However, this document does not refer to the creation of small tension lines, thereby orientating the molecules in a direction perpendicular thereto, and ordering the various wavelengths of light so that an impression of movement is effected using a polarisator and an analysator.

Patent Abstracts of Japan, Vol. 11, No. 68 (p. 553), Feb. 28, 1987, and JP-A-61 231531, Oct. 15, 1986 describe a method for manipulating a video film, for example, with the aid of mirrors. A picture of a film is provided with another background, for example, and this manipulation is recorded on film or videotape.

SUMMARY OF THE INVENTION

In accordance with the present invention, the dies to be used with the known method can be worked locally, by means of laser beams, in a very simple manner to produce the deformations necessary to create the desired tension lines. Taking into account the fact that a small deformation already results in the effect desired, it will be easy to realize the local deformations to the desired extent and in the desired orientation by means of a laser beam. In addition to that, the use of a computer for the laser control makes it possible in a simple manner to provide the desired deformations at any desired location.

According to a further elaboration of the invention, it is possible in a simple manner to provide the desired deformations of a picture carrier or foil, without using a die, but to realize the desired local deformations directly by means of a laser treatment, which acts directly on the foil itself. Of course, such a laser will have to be effectively controlled by means of a computer as well, in order to realize the desired deformations with the required accuracy. A film thus treated can realize the effect desired by means of tension lines and an ink containing polarizing crystals.

In this way the various structures desired, such as, inter alia, described in U.S. Pat. No. 3,437,401, can be realized in a very simple manner and with great accuracy, whereby it is no longer necessary to use a die and it is also possible to provide one or only a few picture carriers with a picture with the desired polarizing effect at very short notice. As a result of this, separate polarizing pictures can be realized much faster and at much lower cost than before.

It is noted, that besides a light source, in front of which a rotating polarizer is located, use may also be made of light sources of polarized light, whereby care must be taken that the orientation of the polarized light is changed after all, e.g., by means of an analyzer disc. It is possible to irradiate the picture or the picture carrier itself with light, so that the picture itself is directly observed by the observer, in the shape of a light box or a neon sign in a shop window. In the latter case the light source may be placed at some distance. For projection systems, however, the light shining through or being reflected, as is, for example, the case with an overhead projector, will be projected on a viewing screen.

DESCRIPTION OF THE PREFERRED EMBODIMENT

Figure 1:
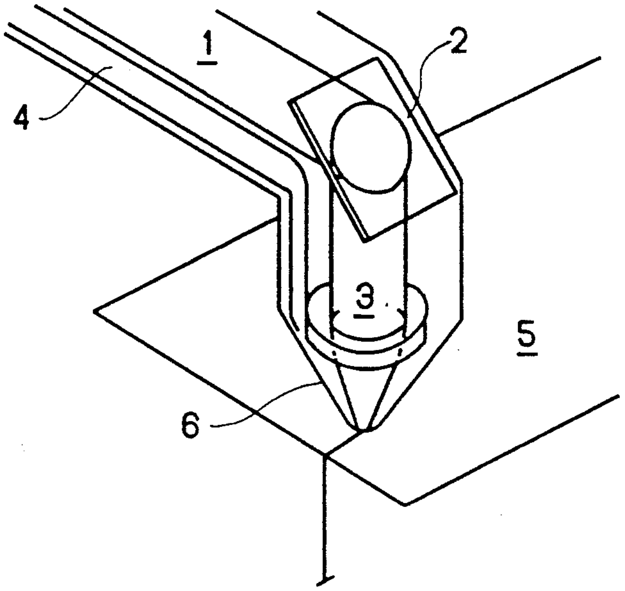
FIG. 1 is a schematic view of an embodiment of a manufacturing system for a polarizing picture according to the invention.

FIG. 1 shows a laser beam 1 deflected by a mirror 2 to a lens 3. The laser beam 1 is surrounded by cutting gas 4 thus preventing the laser beam 1 from diverging. The laser beam 1 is directed to a piece of work 5 via a mouth piece 6.

Figure 2:
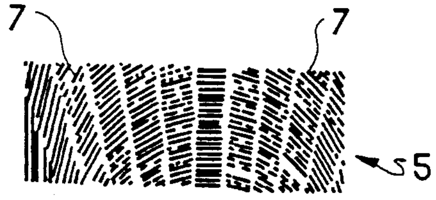
FIG. 2 is an enlarged plan view of a section of the piece of work showing one pattern of tension lines.
Figure 3:
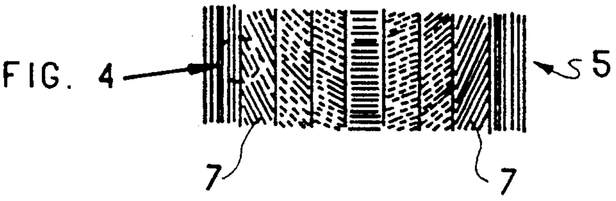
FIG. 3 is a view similar to FIG. 2 showing another pattern of tension lines.
Figure 4:
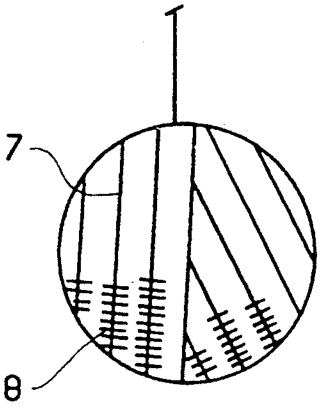
FIG. 4 is a greatly expanded view of the encircled section of FIG. 3.

According to the invention, and as shown in FIGS. 2, 3 and 4, tension lines 7 in the material in the piece of work 5 are orientated in different directions. They thus thereby orient the stretched chain molecules 8 in different directions perpendicular thereto.

We claim:

1. A method of manufacturing a die for forming tension lines along a plurality of predetermined patterns on a picture carrier intended for creating the impression of a movement when a picture is subjected to light on at least certain parts of the picture, by making use of a polarizer and an analyzer and a picture carrier having said tension lines, comprising the steps of directing a laser beam against said die to deform the surface of the die in the patterns corresponding to said predetermined patterns.

2. A method according to claim 1, controlling the movement of the laser beam by means of a computer.

3. A method of directly treating a picture carrier having a picture thereon to form tension lines on the carrier, which lines extend along a plurality of predetermined patterns of different orientation with respect to each other, so as to create the impression of a movement when at least certain parts of the picture are subjected to light, by making use of a polarizer and an analyzer and said picture carrier, comprising the step of directing a laser beam directly against said picture carrier and moving said beam along said surface to deform the surface thereof into said plurality of predetermined patterns of different orientations with respect to each other.

4. A picture carrier manufactured by using a method according to any one of the preceding claims.

* * * * *